United States Patent
Okochi et al.

(10) Patent No.: US 11,335,973 B2
(45) Date of Patent: May 17, 2022

(54) LDH SEPARATOR AND SECONDARY ZINC BATTERY WITH DENDRITE BUFFER LAYER

(71) Applicant: NGK INSULATORS, LTD., Nagoya (JP)

(72) Inventors: Sota Okochi, Nagoya (JP); Shohei Yokoyama, Nagoya (JP)

(73) Assignee: NGK INSULATORS, LTD.

( * ) Notice: Subject to any disclaimer, the term of this patent is extended or adjusted under 35 U.S.C. 154(b) by 292 days.

(21) Appl. No.: 16/420,869

(22) Filed: May 23, 2019

(65) Prior Publication Data
US 2019/0280272 A1 Sep. 12, 2019

Related U.S. Application Data

(63) Continuation of application No. PCT/JP2018/047686, filed on Dec. 25, 2018.

(30) Foreign Application Priority Data

Dec. 27, 2017 (JP) .............................. JP2017-251005

(51) Int. Cl.
*H01M 50/446* (2021.01)
*H01M 50/409* (2021.01)
(Continued)

(52) U.S. Cl.
CPC ......... *H01M 50/446* (2021.01); *H01M 10/30* (2013.01); *H01M 12/08* (2013.01); *H01M 50/409* (2021.01); *H01M 50/449* (2021.01)

(58) Field of Classification Search
CPC ............. H01M 50/446; H01M 50/409; H01M 50/449; H01M 10/30; H01M 12/08;
(Continued)

(56) References Cited

U.S. PATENT DOCUMENTS 9,293,791 B2 3/2016 Yamada et al.
10,290,847 B2 5/2019 Kitoh et al.
(Continued)

FOREIGN PATENT DOCUMENTS

CN 104067437 A 9/2014
CN 104969384 A 10/2015
(Continued)

OTHER PUBLICATIONS

Taiwanese Office Action issued in corresponding application 107146873, dated Jul. 17, 2019, with English translation of pertinent parts (9 pages).
(Continued)

*Primary Examiner* — Kwang Han
(74) *Attorney, Agent, or Firm* — Flynn Thiel, P.C.

(57) ABSTRACT

A layered double hydroxide (LDH) separator capable of more effectively restraining short circuiting caused by zinc dendrites. The LDH separator for secondary zinc batteries includes a porous substrate made of a polymer material and a LDH plugging pores in the porous substrate. The LDH separator has a dendrite buffer layer therein, the dendrite buffer layer being at least one selected from the group consisting of: (i) a pore-rich internal porous layer in the porous substrate, the internal porous layer being free from the LDH or deficient in the LDH; (ii) a releasable interfacial layer; which is provided by two adjacent layers constituting part of the LDH separator in releasable contact with each other; and (iii) an internal gap layer free from the LDH and the porous substrate, which is provided by two adjacent layers constituting part of the LDH separator formed apart from each other.

11 Claims, 7 Drawing Sheets

(51) Int. Cl.
*H01M 50/449* (2021.01)
*H01M 12/08* (2006.01)
*H01M 10/30* (2006.01)

(58) Field of Classification Search
CPC .. H01M 10/32; H01M 10/4235; H01M 10/24; H01M 12/06; H01M 4/38; Y02P 70/50; Y02E 60/10
See application file for complete search history.

(56) References Cited

U.S. PATENT DOCUMENTS

| | | | |
|---|---|---|---|
| 2015/0171398 A1* | 6/2015 | Roumi | H01M 10/4257 429/7 |
| 2015/0364790 A1 | 12/2015 | Yonehara et al. | |
| 2017/0214019 A1 | 7/2017 | Yokoyama et al. | |
| 2017/0229697 A1 | 8/2017 | Hayashi et al. | |
| 2017/0373298 A1* | 12/2017 | Kitoh | H01M 10/281 |

FOREIGN PATENT DOCUMENTS

| | | |
|---|---|---|
| CN | 107078357 A | 8/2017 |
| JP | 2004189671 A | 7/2004 |
| JP | 2007031189 A | 2/2007 |
| JP | 2011178966 A | 9/2011 |
| JP | 201515229 A | 1/2015 |
| JP | 2015095286 A | 5/2015 |
| WO | 2013118561 A1 | 8/2013 |
| WO | 2016067884 A1 | 5/2016 |
| WO | 2016076047 A1 | 5/2016 |

OTHER PUBLICATIONS

English translation of Written Opinion of the International Searching Authority for PCT/JP2018/047686, dated Sep. 16, 2019 (9 pages).
International Search Report issued in International Application No. PCT/JP2018/047686, with English translation, dated Jan. 29, 2019 (5 pages).
Written Opinion of International Searching Authority issued in International Application No. PCT/JP2018/047686, with English translation, dated Jan. 29, 2019 (10 pages).

* cited by examiner

LDH SEPARATOR AND SECONDARY ZINC BATTERY WITH DENDRITE BUFFER LAYER

CROSS-REFERENCE TO RELATED APPLICATIONS

This is a continuation of PCT/JP2018/047686 filed Dec. 25, 2018, which claims priority to Japanese Patent Application No. 2017-251005 filed Dec. 27, 2017, the entire contents of which are hereby incorporated by reference.

BACKGROUND OF THE INVENTION

1. Field of the Invention

The present invention relates to a LDH separator and a secondary zinc battery.

2. Description of the Related Art

In secondary zinc batteries, such as secondary nickel-zinc batteries and secondary air-zinc batteries, it is known that metallic zinc dendrites precipitate on negative electrodes during a charge mode, penetrate through voids in separators composed of, for example, non-woven fabrics, and reach positive electrodes, resulting in short circuiting. The short circuiting caused by such zinc dendrites occurs during repeated charge/discharge operations, leading to a reduction in the service lives of the secondary zinc batteries.

In order to solve such a problem, secondary zinc batteries have been proposed that include layered double hydroxide (LDH) separators that selectively permeate hydroxide ions while blocking the penetration of zinc dendrites. For example, PTL 1 (WO 2013/118561) discloses a secondary nickel-zinc battery including a LDH separator disposed between a positive electrode and a negative electrode. PTL 2 (WO 2016/076047) discloses a separator structure including a LDH separator that is fitted in or joined to a resin frame and is dense enough to restrict the permeation of a gas and/or water. PTL 2 also discloses that the LDH separator may be a composite with a porous substrate. In addition, PTL 3 (WO 2016/067884) discloses various methods for forming a dense LDH membrane on the surface of a porous substrate to give a composite material (a LDH separator). These methods include the steps of: uniformly bonding an initiating material capable of giving origins of crystal growth of LDH to the porous substrate; and then subjecting the porous substrate to a hydrothermal treatment in an aqueous raw material solution to form a dense LDH membrane on the surface of the porous substrate.

CITATION LIST

Patent Literature

PTL1: WO2013/118561
PTL2: WO2016/076047
PTL3: WO2016/067884

SUMMARY OF THE INVENTION

Secondary zinc batteries, for example, nickel-zinc batteries, constructed with the LDH separator as described above usually do not cause short circuiting by zinc dendrites; however, the penetration of zinc dendrites and thus short circuiting between positive and negative electrodes may eventually occur in an abnormal situation, i.e., intrusion of zinc dendrites into the LDH separator due to, for example, some defects. Accordingly, a further improvement is desired for a preventive effect of the short circuiting caused by the dendrites.

The present inventors have now founded that a LDH separator that can more effectively restrain the short circuiting caused by zinc dendrites can be provided through providing a dendrite buffer layer with a predetermined configuration inside the LDH separator.

Accordingly, an object of the present invention is to provide a LDH separator capable of more effectively restraining the short circuiting caused by zinc dendrites.

According to an embodiment of the present invention, a LDH separator is provided for secondary zinc batteries. The separator comprises a porous substrate made of a polymeric material and a layered double hydroxide (LDH) that plugs the pores in the porous substrate. The LDH separator has in its inside a dendrite buffer layer. The dendrite buffer layer is at least one selected from the group consisting of:

(i) a pore-rich internal porous layer in the porous substrate, the internal porous layer being free from the LDH or deficient in the LDH;

(ii) a releasable interfacial layer which is provided by two adjacent layers constituting part of the LDH separator being in releasable contact with each other; and (iii) an internal gap layer being free from the LDH and the porous substrate, which is provided by two adjacent layers constituting part of the LDH separator being formed apart from each other.

According to another embodiment of the present invention, a secondary zinc battery is provided comprising the LDH separator described above.

DETAILED DESCRIPTION OF THE INVENTION

LDH Separator

Figure 1:
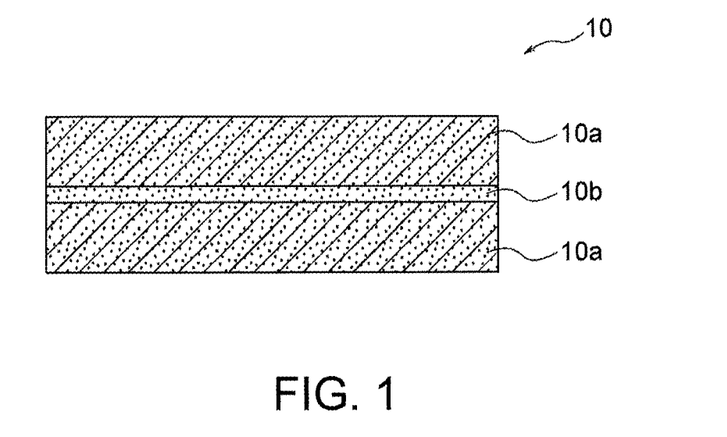
FIG. 1 is a schematic cross-sectional view illustrating a LDH separator including an internal porous layer functioning as a dendrite buffer layer.
Figure 2:
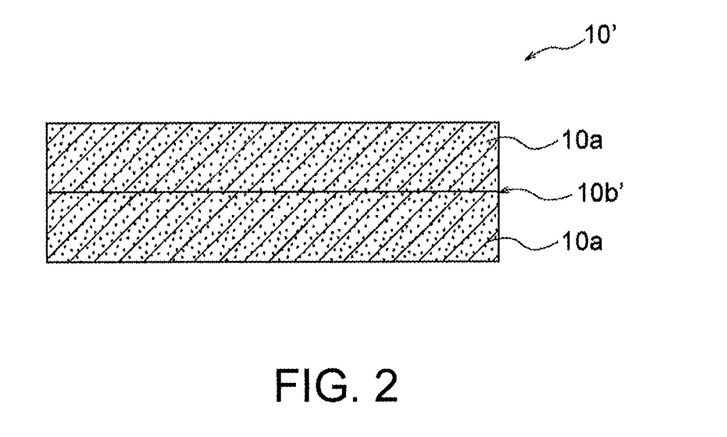
FIG. 2 is a schematic cross-sectional view illustrating a LDH separator including a releasable interfacial layer functioning as a dendrite buffer layer.
Figure 3:
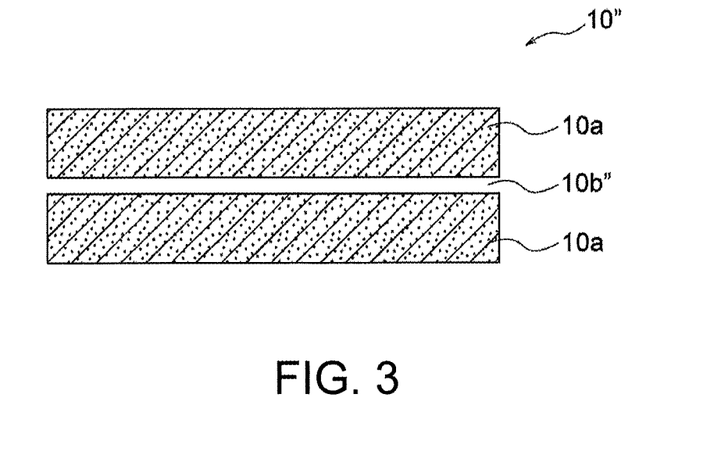
FIG. 3 is a schematic cross-sectional view illustrating a LDH separator including an internal gap layer functioning as a dendrite buffer layer.

The LDH separator of the present invention, which is used in secondary zinc batteries, comprises a porous substrate and a layered double hydroxide (LDH). In the present specification, "LDH separator" includes the LDH and is defined as a separator that can selectively permeate hydroxide ions due to mainly the hydroxide ionic conductivity of the LDH. The porous substrate is composed of a polymeric material and the pores in the porous substrate are filled with the LDH. The LDH separator has in its inside a dendrite buffer layer. The dendrite buffer layer may include: (i) a pore-rich internal porous layer $10b$ in the porous substrate, the internal porous layer $10b$ being free from the LDH or deficient in the LDH, as shown in FIG. 1; (ii) a releasable interfacial layer $10b'$, which is provided by two adjacent layers constituting part of the LDH separator being in releasable contact with each other, as shown in FIG. 2; or (iii) an internal gap layer $10b''$ (free from the LDH and the porous substrate), which is provided by two adjacent layers constituting part of the LDH separator being apart from each other, as shown in FIG. 3. As described above, at least one dendrite buffer layer selected from the group consisting of (i), (ii) and (iii) provided inside the LDH separator can more effectively restrain the short circuiting caused by the zinc dendrites.

As described above, a secondary zinc battery, such as a nickel-zinc battery, constructed with a conventional LDH separator usually can prevent short circuiting caused by zinc dendrites; however, the penetration of zinc dendrites and thus the short circuiting between positive and negative electrodes may eventually occur in an abnormal situation, i.e., the intrusion of zinc dendrites into the LDH separator due to, for example, some defects. It is presumed that the penetration of zinc dendrites through the conventional separator occurs based on the following mechanism: (a) the zinc dendrites intrude into voids or defects contained in the separator; (b) the dendrites grow and develop while expanding the separator, and then (c) the dendrites eventually penetrate through the separator. In contrast, the LDH separator of the present invention is intentionally provided with a dendrite buffer layer inside the separator that has a configuration in a manner such as above (i) to (iii) to allow the zinc dendrites to grow and the deposition and growth of zinc dendrites D can be confined only in the dendrite buffer layer, for example, shown in FIG. 10, resulting in the prevention or significant delay of the penetration of the dendrites through the separator, and thereby more effectively blocking of the short circuiting caused by the zinc dendrites.

Furthermore, the LDH separator of the present invention has an excellent flexibility and strength, as well as a desired ionic conductivity based on the hydroxide ionic conductivity of the LDH. The flexibility and strength are caused by the polymeric porous substrate itself of the LDH separator. In other words, the LDH separator is densified in such a manner that the pores of the porous polymer substrate are sufficiently filled with the LDH, thereby a high rigidity and low ductility caused by the LDH, which is a ceramic material, can be balanced with or reduced by the high flexibility and high strength of the porous polymeric substrate.

In a preferred embodiment of the present invention, the dendrite buffer layer is (i) a pore-rich internal porous layer $10b$ in the porous substrate, the internal porous layer being free from the LDH or deficient in the LDH as the LDH separator 10 shown in FIG. 1. In other words, the LDH separator 10 of the present embodiment includes a pair of LDH separator bodies $10a$ including the porous substrate and the LDH, and an internal porous layer $10b$ interposed between the LDH separator bodies $10a$. The internal porous layer $10b$ consists of a porous substrate or includes a porous substrate and a reduced amount or density of the LDH. The LDH separator bodies $10a$ may have the same configuration as the conventional LDH separators disclosed in PTLs 1 to 3, and thus can exhibit the same preventive advantage to short circuiting caused by dendrites as the conventional LDH separator. However, a further improvement is desired as described above. In the present embodiment, the internal porous layer $10b$ that has pore-rich portions of the porous substrate and is free from or deficient in the LDH is interposed between the pair of LDH separator bodies $10a$; hence, zinc dendrites are preferentially deposited and grown in the pores not filled with the LDH of the porous substrate, and the deposition and growth of zinc dendrite are confined only within the internal porous layer $10b$, resulting in the blocking or significantly delaying the penetration of the dendrites through the separator. The LDH separator 10 of the present embodiment can be manufactured by depositing the LDH such that a single sheet of the porous substrate has a higher density at two sides and a low density in a central region across the thickness. This deposition process can be carried out through, for example, immersing the porous substrate in a solvent such as ethanol immediately before dip coating the porous substrate with an alumina/titania mixed sol, and blocking the impregnation of the mixed sol into the central region across the thickness of the porous substrate. The internal porous layer $10b$ has a thickness of preferably 0.5 mm or less, more preferably 0.3 mm or less, further more preferably 0.1 mm or less, particularly more preferably 0.05 mm or less, most preferably 0.01 mm or less. Although a larger thickness of the internal porous layer $10b$ is preferred to reduce the dendrite growth, a smaller thickness is preferred in the application to batteries because the electrical resistance increases with the thickness of the internal porous layer $10b$.

According to another preferred embodiment of the present invention, the dendrite buffer layer is (ii) a releasable interfacial layer $10b'$ at which two adjacent layers composing part of the LDH separator are in releasable contact with each other, like the LDH separator 10' shown in FIG. 2. In other words, the LDH separator 10' of the present embodiment comprises a pair of LDH separator bodies $10a$ including the porous substrate and the LDH, and a releasable interfacial layer $10b'$ in releasable contact with the pair of LDH separator bodies $10a$. In the present specification, "two layers are in releasable contact with each other" indicates that the two layers are fully or partially in contact with each other, and the contact area of the two layers can be reduced (e.g., one layer can be at least partially away from the other layer) along with the deposition and growth of zinc dendrites at the interface between the two layers. The LDH separator bodies $10a$ may have the same configuration as the conventional LDH separators as disclosed in PTLs 1 to 3, and thus can exhibit the same preventive advantage to short circuiting caused by dendrites as the conventional LDH separators.

However, a further improvement is desired as described above. In the present embodiment, the releasable interfacial layer 10b' is provided that releasably contacts with the pair of LDH separator bodies 10a, the zinc dendrites are preferentially deposited and grown on the releasable interfacial layer 10b', and the deposition and growth of zinc dendrites while expanding the releasable interfacial layer 10b' are confined only within the releasable interfacial layer 10b', thereby the penetration of the dendrites through the separator can be prevented or significantly delayed. The LDH separator 10' of the present embodiment can be manufactured by stacking a pair of LDH separator bodies 10a. Furthermore, the stack of the LDH separator bodies 10a is preferably pressed to densify during or after the stacking process. The pressing of the stack may be performed by any process, such as roll pressing, uniaxial pressing, and CIP (cold isostatic pressing), preferably roll pressing. The stack may be pressed while being heated to soften the polymeric porous substrate, such that the pores of the porous substrate can be sufficiently filled with the LDH. The temperature to sufficiently soften the substrate is preferably 60° C. or higher in the case of, for example, polypropylene.

According to another preferred embodiment of the present invention, the dendrite buffer layer is (iii) an inner space layer 10b" (without the LDH and the porous substrate), like the LDH separator 10" shown in FIG. 3, the inner space layer being formed such that two adjacent layers constituting a part of the LDH separator are disposed apart from each other. In other words, the LDH separator 10" of the present embodiment includes a pair of LDH separator bodies 10a including the porous substrate and the LDH, and the inner space layer 10b" (without the LDH and the porous substrate) interposed between the pair of LDH separator bodies 10a. The LDH separator bodies 10a may have the same configuration as the conventional LDH separators as disclosed in PTLs 1 to 3, and thus can exhibit the same preventive advantage to short circuiting caused by dendrites as the conventional LDH separators. However, a further improvement is desired as described above. In the present embodiment, the inner space layer 10b" without the porous substrate and the LDH is provided between the pair of LDH separator bodies 10a, zinc dendrites are preferentially deposited and grown in the inner space layer 10b", and the deposition and growth of zinc dendrites are confined only within the internal porous layer 10b", thereby the penetration of the dendrites through the separator can be prevented or significantly delayed. The LDH separator 10" of the present embodiment can be manufactured by disposing a pair of LDH separator bodies 10a apart from each other. A spacer may be interposed between the pair of LDH separator bodies 10a. The spacer desirably has a low electrical resistance to avoid being resistant in the separator. Examples of low-resistance spacers include conductive materials and porous substrates through which an aqueous alkaline solution can flow (i.e., having communication paths across the thickness). Also, the spacer is preferably thinner for the same reason. Each of the LDH separator bodies 10a is preferably pressed to densify prior to disposing as described above. This pressing may be performed by any procedure, such as roll pressing, uniaxial pressure pressing, and CIP (cold isostatic pressing), preferably roll pressing. This pressing preferably involves heating of the composite material to soften the polymeric porous substrate and thereby to sufficiently plug the pores in the porous substrate with the LDH. For example, the heating temperature required for enough softening is preferably 60° C. or higher in the case that the polymer is polypropylene. The inner space layer 10b" has a thickness of preferably 1 mm or less, more preferably 0.5 mm or less, further more preferably 0.1 mm or less, particularly more preferably 0.05 mm or less, most preferably 0.01 mm or less. The inner space layer 10b" has any lower limit of thickness, because a small space is merely enough for the inner space layer 10b" and the thickness is preferably as small as possible in the case of being incorporated into batteries (in particular, small batteries).

The LDH separator includes a layered double hydroxide (LDH), can isolate a positive electrode plate from a negative electrode plate and ensures a hydroxide ionic conductivity therebetween in a secondary zinc battery. The LDH separator functions as a hydroxide ionic conductive separator. A preferred LDH separator has a gas-impermeability and/or water-impermeability. In other words, the LDH separator is preferably densified to an extent that it exhibits a gas-impermeability and/or water-impermeability. The phrase "having a gas-impermeability" throughout the specification indicates that no bubbling of helium gas is observed at one side of a sample when helium gas is brought into contact with the other side in water at a differential pressure of 0.5 atm across the thickness as described in PTLs 2 and 3. In addition, the phrase "having a water-impermeability" throughout the specification indicates that water in contact with one side of the sample does not permeate to the other side as described in PTLs 2 and 3. As a result, the LDH separator having a gas-impermeability and/or water-impermeability indicates having a high density to an extent that no gas or no water permeates therethrough, and not being a porous membrane or any other porous material that has a gas-permeability or water-permeability. Accordingly, the LDH separator can selectively permeate only hydroxide ions due to its hydroxide ionic conductivity and can serve as a battery separator. The LDH separator thereby has a physical configuration that prevents the penetration of zinc dendrites generated during a charge mode through the separator, resulting in prevention of short circuiting between positive and negative electrodes. Since the LDH separator has a hydroxide ionic conductivity, the ionic conductivity allows a necessary amount of hydroxide ions to efficiently move between the positive electrode plate and the negative electrode plate, and thereby a charge/discharge reaction can be achieved on the positive electrode plate and the negative electrode plate.

The LDH separator preferably has a helium permeability per unit area of 3.0 cm/min·atm or less, more preferably 2.0 cm/min·atm or less, further more preferably 1.0 cm/min·atm or less. A separator having a helium permeability of 3.0 cm/min·atm or less can remarkably restrain the permeation of Zn (typically, the permeation of zinc ions or zincate ions) in the electrolytic solution. Thus, it is conceivable in principle that the separator of the present embodiment can effectively restrain the growth of zinc dendrites when used in secondary zinc batteries because Zn permeation is significantly suppressed. The helium permeability is measured through the steps of: supplying helium gas to one side of the separator to allow the helium gas to permeate into the separator; and calculating the helium permeability to evaluate the density of the hydroxide ion conductive separator. The helium permeability is calculated from the expression of $F/(P \times S)$ where F is the volume of permeated helium gas per unit time, P is the differential pressure applied to the separator when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because helium gas has the smallest constitutional unit among various atoms or molecules which can constitute the gas and its reactivity is extremely low. That is, helium does not form a molecule and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the separator has sufficiently high density suitable for separators of secondary zinc batteries can be evaluated readily, safely and effectively. The helium permeability can be preferably measured in accordance with the procedure shown in Evaluation 5 in the Examples described later.

In the LDH separator of the present invention, the pores (except for the dendrite buffer layer) in the porous substrate are filled with the LDH, preferably completely filled with the LDH. As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH are composed of anions and $H_2O$. The anions are monovalent or multivalent anions, preferably monovalent or divalent ions. The anions in the LDH preferably include $OH^-$ and/or $CO_3^{2-}$. The LDH has a high ionic conductivity based on its inherent properties.

In general, the LDH is known to typically have the fundamental formula: $M^{2+}_{1-x}M^{3+}_x(OH)_2A^{n-}_{x/n}\cdot mH_2O$ (wherein $M^{2+}$ is a divalent cation, $M^{3+}$ is a trivalent cation, $A^{n-}$ is n-valent anion, n is an integer of 1 or more, x is 0.1 to 0.4, and m is 0 or more). In the above fundamental formula, $M^{2+}$ may be any divalent cation and includes, preferably, $Mg^{2+}$, $Ca^{2+}$ and $Zn^{2+}$, more preferably $Mg^{2+}$. $M^{3+}$ may be any trivalent cation and includes, preferably, $Al^{3+}$ and $Cr^{3+}$, more preferably $Al^{3+}$. $A^{n-}$ may be any anion, and preferably includes $OH^-$ and $CO_3^{2-}$. Accordingly, it is preferred that $M^{2+}$ includes $Mg^{2+}$, $M^{3+}$ includes $Al^{3+}$, and $A^{n-}$ includes $OH^-$ and/or $CO_3^{2-}$ in the above fundamental formula. n is an integer of 1 or more, preferably 1 or 2. x is 0.1 to 0.4, preferably 0.2 to 0.35. m is an any molar number of water and is a real number of 0 or more, typically more than 0 or 1. However, the above fundamental formula merely represents "a fundamental composition" typically illustrated for the LDH, and constituent ions can be appropriately replaced. For example, in the above fundamental formula, part or the whole of $M^{3+}$ may be replaced with a tetravalent or higher valence cation, where the coefficient x/n of the anion $A^{n-}$ may be appropriately varied in the above fundamental formula.

For example, the basic hydroxide layers of LDH may be composed of Ni, Ti, OH groups and optional incidental impurities. The intermediate layers of LDH are composed of anions and $H_2O$ as described above. Although the alternately stacked structure itself of basic hydroxide layers and intermediate layers is basically the same as the commonly known alternately stacked structure of LDH, the LDH of the embodiment, which is composed of the basic hydroxide layers mainly having Ni, Ti and OH groups of LDH, can exhibit a high alkaline resistance. Although the reason is not clear, it is believed that no element (for example, Al) readily dissolved in an alkaline solution is intentionally added to the LDH of the embodiment. Nevertheless, the LDH of the embodiment can also exhibit a high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Ti in the LDH can have the form of titanium ions. Although titanium ions in the LDH are typically believed to be $Ti^{4+}$, they may be present in any other valence, for example, $Ti^{3+}$. Each of the incidental impurities is any element which may be inevitably mixed in a manufacturing process and it may be mixed into the LDH from, for example, a raw material or a substrate. As described above, it is impractical or impossible to strictly specify the LDH with a general formula since the valences of Ni and Ti are not necessarily confirmed. Assuming that the basic hydroxide layers are mainly composed of $Ni^{2+}$, $Ti^{4+}$ and OH groups, the fundamental composition of the corresponding LDH can be represented by the general formula: $Ni^{2+}_{1-x}Ti^{4+}_x(OH)_2A^{n-}_{2x/n}\cdot mH_2O$ wherein $A^{n-}$ is an n-valent anion, n is an integer of 1 or more, preferably 1 or 2, x is above 0 to below 1, preferably 0.01 to 0.5, and m is a real number of 0 or more, typically a real number above 0 or 1. However, it should be understood that the general formula indicates merely the "fundamental composition", and it may be replaced with other elements or ions (including elements with other valences of the same element, or elements or ions that may be unavoidably mixed in the manufacturing process) to such an extent that the elements such as $Ni^{2+}$, and $Ti^{4+}$ do not impair the basic properties of LDH.

Alternatively, the basic hydroxide layers of LDH comprise Ni, Al, Ti and OH groups. The intermediate layers are composed of anions and $H_2O$ as described above. Although the alternately stacked structure itself of basic hydroxide layers and intermediate layers is basically the same as the generally known alternately stacked structure of LDH, the LDH of the embodiment, in which the basic hydroxide layers of the LDH are composed of predetermined elements and/or ions including Ni, Al, Ti and OH groups of LDH, can exhibit high alkaline resistance. Although the reason is not clear, it is believed that Al, which has been considered to be readily dissolved in an alkaline solution, is hard to elute into the alkaline solution due to some interaction with Ni and Ti. Nevertheless, the LDH of the embodiment can also exhibit a high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of aluminum ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions as long as they contain Ni, Al, Ti and OH groups. However, the basic hydroxide layers preferably contain Ni, Al, Ti and OH groups as main constituent elements. That is, it is preferred that the basic hydroxide layers are mainly composed of Ni, Al, Ti and OH groups. Accordingly, the basic hydroxide layers are typically composed of Ni, Al, Ti, OH groups and optional incidental impurities. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni, Al and Ti are not necessarily confirmed. Assuming that the basic hydroxide layers are mainly composed of $Ni^{2+}$, $Al^{3+}$, $Ti^{4+}$ and OH groups, the fundamental composition of the corresponding LDH can be represented by the general formula: $Ni^{2+}_{1-x-y}Al^{3+}_{x}Ti^{4+}_{y}(OH)_2 A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1. However, it should be understood that the general formula indicates merely the "fundamental composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

As described above, the LDH separator comprises the LDH and the porous substrate (typically consists of the porous substrate and the LDH), and the LDH plugs the pores in the porous substrate such that the LDH separator exhibits a hydroxide ionic conductivity and gas-impermeability (thus, so as to serve as a LDH separator exhibiting a hydroxide ionic conductivity). In particular, the LDH is preferably embedded over the entire thickness of the porous substrate other than the dendrite buffer layer (For example, the LDH preferably plugs most or all of the pores inside the porous substrate other than the dendrite buffer layer). The LDH separator has an overall thickness (a thickness including the dendrite buffer layer) of preferably 5 µm to 5 mm, more preferably 5 µm to 1 mm, further more preferably 5 µm to 0.5 mm, particularly more preferably 5 µm to 0.3 mm.

The porous substrate is composed of a polymeric material. The polymeric porous substrate has the following advantages; (1) a high flexibility (hard to crack even if thinned), (2) a high porosity, (3) a high conductivity (small thickness with high porosity), and (4) a good manufacturability and handling ability. The polymeric porous substrate has a further advantage; (5) readily folding and sealing the LDH separator including the porous substrate composed of the polymeric material based on the advantage (1): a high flexibility. Preferred examples of the polymeric material include polystyrene, poly(ether sulfone), polypropylene, epoxy resin, poly(phenylene sulfide), fluorocarbon resin (tetra-fluorinated resin such as PTFE), cellulose, nylon, polyethylene and any combination thereof. More preferred examples include polystyrene, poly(ether sulfone), polypropylene, epoxy resin, poly(phenylene sulfide), fluorocarbon resin (tetra-fluorinated resin such as PTFE), nylon, polyethylene and any combination thereof from the viewpoint of a thermoplastic resin suitable for hot pressing. All the various preferred materials described above have an alkali resistance to be resistant to the electrolytic solution of batteries. More preferred polymeric materials are polyolefins, such as polypropylene and polyethylene, most preferred are polypropylene and polyethylene from the viewpoint of an excellent hot-water resistance, acid resistance and alkali resistance, and low material cost. In case that the porous substrate is composed of the polymeric material, the LDH layer is particularly preferably embedded over the entire thickness of the porous substrate (for example, most pores or substantially all of the pores inside the porous substrate are filled with the LDH). A polymeric microporous membrane commercially available can be preferably used as such a polymeric porous substrate.

The dendrite buffer layer may be produced by the process described above and a portion of the LDH separator other than the dendrite buffer layer or the LDH separator body 20a can be produced by any process, preferably with an appropriate modification of various conditions in known methods (e.g., see PTLs 1 to 3) for producing the LDH-containing functional layer and the composite material (that is, the LDH separator). For example, the LDH-containing functional layer and the composite material (that is, the LDH separator) can be produced by the Steps of: (1) providing a porous substrate; (2) applying a titanium oxide sol or a mixed sol of alumina and titania onto the porous substrate and then heating the sol to form a titanium oxide layer or an alumina/titania layer; (3) immersing the porous substrate into an aqueous raw material solution containing nickel ions ($Ni^{2+}$) or magnesium ion ($Mg^{2+}$) and urea; and (4) hydrothermally treating the porous substrate in the aqueous raw material solution to form the LDH-containing functional layer on the porous substrate and/or in a porous substrate. In particular, in Step (2), forming the titanium oxide layer or the alumina/titania layer on the porous substrate can not only produce a raw material for the LDH, but also serve as a seed of LDH crystalline growth and uniformly form the LDH-containing functional layer that is highly densified on the surface of the porous substrate. In addition, in Step (3), the presence of urea raises the pH value by the generation of ammonia in the solution through the hydrolysis of urea and gives the LDH by the formation of a hydroxide with coexisting metal ions. Also, the generation of carbon dioxide in hydrolysis gives a LDH of a carbonate anion type.

In particular, a composite material (that is, the LDH separator) in which the porous substrate is composed of a polymeric material and the functional layer is embedded over the porous substrate in the thickness direction is produced by applying the mixed sol of alumina and titania to the substrate in Step (2) in such that the mixed sol permeates into all or most of the area of the interior pores of the substrate. By this manner, most or substantially all of the pores inside the porous substrate can be embedded with the LDH. Examples of a preferred application include dip coating and filtration coating. Particularly preferred is dip coating. The amount of the deposited mixed sol can be varied by adjusting the number of times of coating such as dip coating. The substrate coated with the mixed sol by, for example, dip coating may be dried and then subjected to Steps (3) and (4).

Secondary Zinc Batteries

The LDH separator of the present invention is preferably applied to secondary zinc batteries. According to a preferred embodiment of the present invention, a secondary zinc battery comprising the LDH separator is provided. A typical secondary zinc battery includes a positive electrode, a negative electrode, and an electrolytic solution, and isolates the positive electrode from the negative electrode with the LDH separator therebetween. The secondary zinc battery of the present invention may be of any type that includes a zinc negative electrode and an electrolytic solution (typically, an aqueous alkali metal hydroxide solution). Accordingly, examples of the secondary zinc battery include secondary nickel-zinc batteries, secondary silver oxide-zinc batteries, secondary manganese oxide-zinc batteries, secondary zinc-air batteries, and various other secondary alkaline zinc batteries. For example, the secondary zinc battery may preferably be a secondary nickel-zinc battery, the positive electrode of which contains nickel hydroxide and/or nickel oxyhydroxide. Alternatively, the secondary zinc battery may be a secondary zinc-air battery, the positive electrode of which is an air electrode.

Other Batteries

The LDH separator of the present invention can be used not only in secondary zinc batteries such as nickel-zinc batteries but also in, for example, nickel-hydrogen batteries. In this case, the LDH separator serves to block a nitride shuttle (movement of nitrate groups between electrodes), which is a factor of the self-discharging in the battery. The LDH separator of the present invention can also be applied in, for example, lithium batteries (batteries having a negative electrode composed of lithium metal), lithium ion batteries (batteries having a negative electrode composed of, for example, carbon), or lithium-air batteries.

EXAMPLES

The invention will be further described in more detail by the following Examples. The following procedures were used to evaluate the LDH separator produced in these Examples.

Evaluation 1: Identification of LDH Separator

The crystalline phase of the LDH layer was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card N0.35-0964.

Evaluation 2: Determination of Density

Figure 4A:
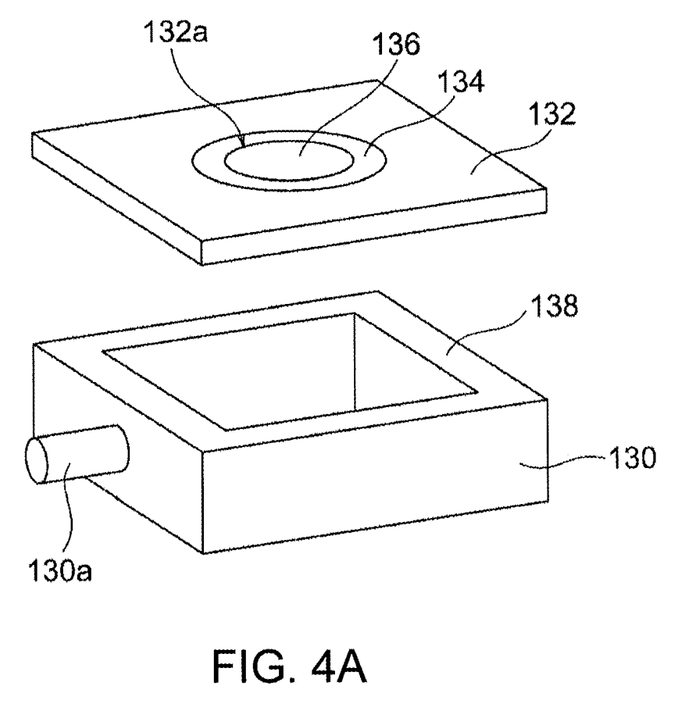
FIG. 4A is an exploded perspective view of a closed container used in the determination of density in Examples 1 to 4.
Figure 4B:
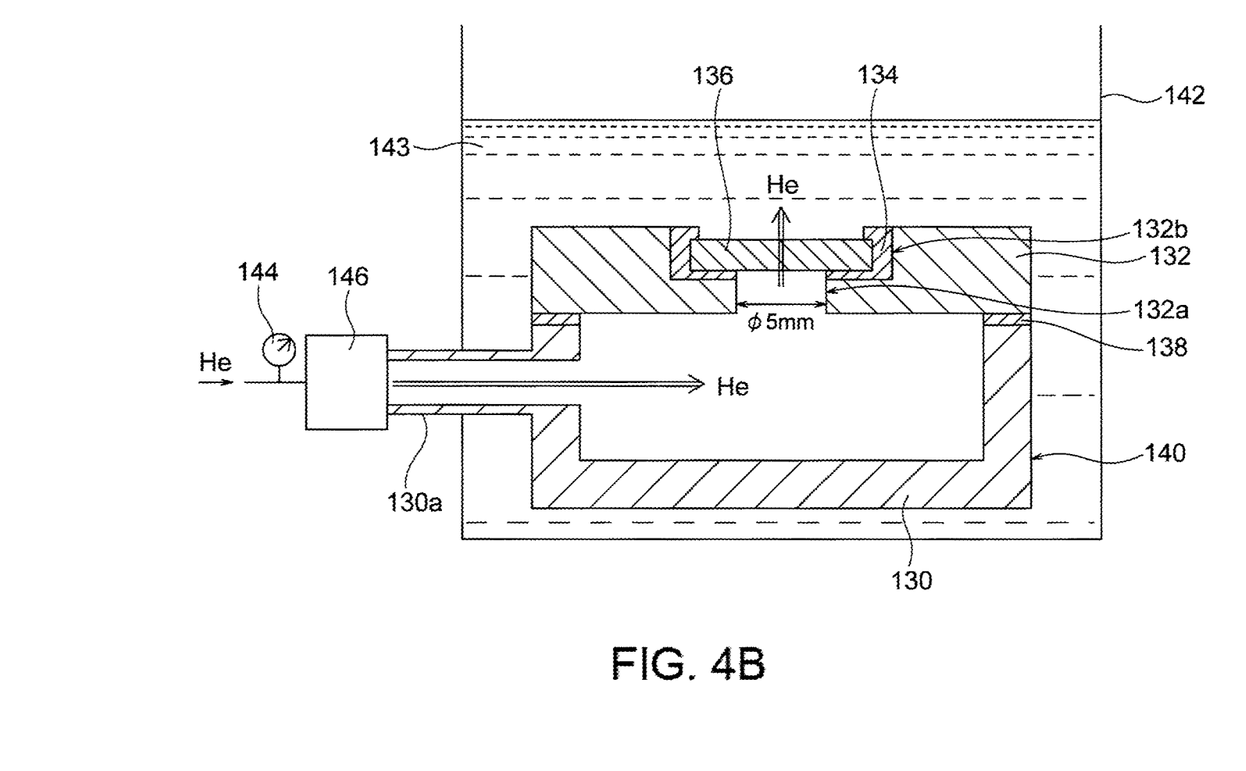
FIG. 4B is a schematic cross-sectional view of the measurement system used in the determination of density in Examples 1 to 4.

The density was determined to confirm that the LDH separator had a density having no gas permeability. As shown in FIGS. 4A and 4B, an open acrylic container 130 and an alumina jig 132 with a shape and dimensions capable of working as a cover of the acrylic container 130 were provided. The acrylic container 130 was provided with a gas supply port 130a. The alumina jig 132 had an opening 132a having a diameter of 5 mm and a cavity 132b surrounding the opening 132a for placing the sample. An epoxy adhesive 134 was applied onto the cavity 132b of the alumina jig 132. The LDH separator was placed into the cavity 132b and was bonded to the alumina jig 132 in an air-tight and liquid-tight manner. The alumina jig 132 with the LDH separator 136 was then bonded to the upper end of the acrylic container 130 in an air-tight and liquid-tight manner with a silicone adhesive 138 to completely seal the open portion of the acrylic container 130. A hermetic container 140 was thereby completed for the measurement. The hermetic container 140 for the measurement was placed in a water vessel 142 and the gas supply port 130a of the acrylic container 130 was connected to a pressure gauge 144 and a flow meter 146 so that helium gas was supplied into the acrylic container 130. Water 143 was poured in the water vessel 142 to completely submerge the hermetic container 140 for the measurement. At this time, the air-tightness and liquid-tightness were sufficiently kept in the interior of the hermetic container 140 for the measurement, and one surface of the LDH separator 136 was exposed to the internal space of the hermetic container 140 for the measurement while the other surface of the LDH separator 136 was in contact with water in the water vessel 142. In this state, helium gas was introduced into the acrylic container 130 of the hermetic container 140 for the measurement through the gas supply port 130a. The pressure gauge 144 and the flow meter 146 were controlled such that the differential pressure between the inside and outside of LDH separator 136 reached 0.5 atm (that is, the pressure applied to one surface of the helium gas is 0.5 atm higher than the water pressure applied to the other surface) to observe whether or not bubbling of helium gas occurred in water from the LDH separator 136. When the bubbling of helium gas was not observed, the LDH separator 136 was determined to have a high density with no gas permeability.

Evaluation 3: Observation of cross-sectional microstructure A cross-sectional polished surface of the LDH separator was prepared with an ion milling system (IM4000, manufactured by Hitachi High-Technologies Corporation). The microstructure on the cross-sectional polished surface was observed at an acceleration voltage of 10 kV and each view was photographed at magnifications of 500 fold, 1000 fold, 2500 folds, 5000 fold and 10000 fold with a scanning electron microscope (SEM, JSM-6610LV, manufactured by JEOL Ltd.).

Evaluation 4: Test of Short Circuiting Caused by Dendrites

Figure 5:
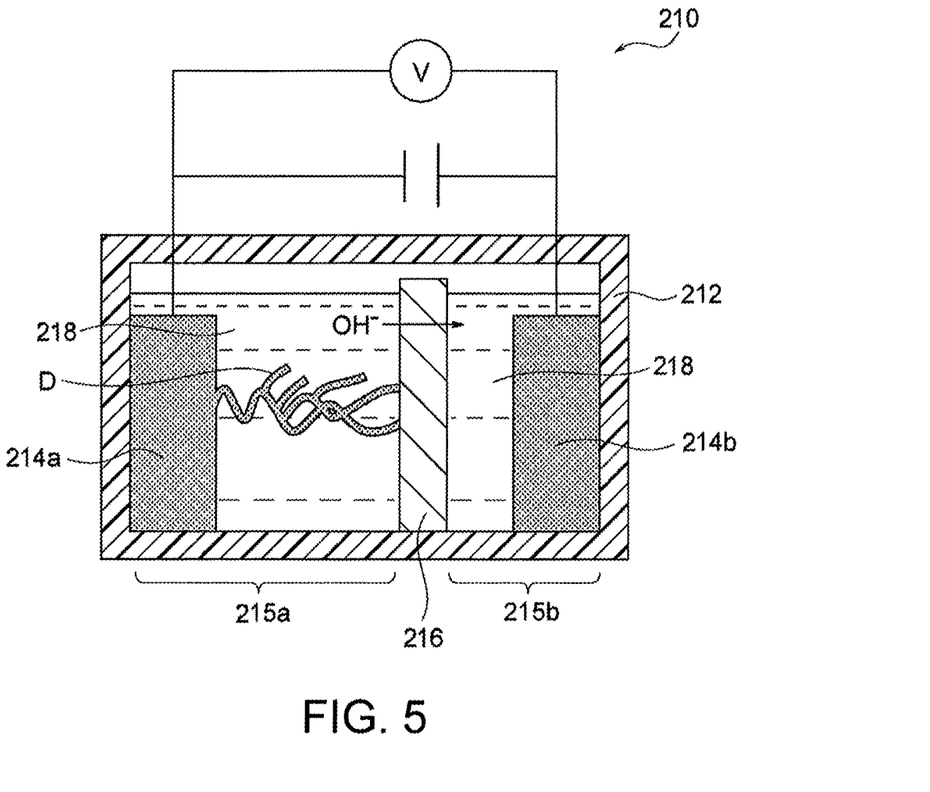
FIG. 5 is a schematic cross-sectional view of a measurement device used in the determination of short circuiting caused by dendrites in Examples 1 to 4.

A device 210 was assembled as shown in FIG. 5 and an accelerated test was carried out to continuously grow zinc dendrites. Specifically, a rectangular container 212 made of an ABS resin was prepared, in which a zinc electrode 214a is separated by 0.5 cm from a copper electrode 214b to face each other. The zinc electrode 214a is a metal zinc plate and the copper electrode 214b is a metal copper plate. In addition, a LDH separator structure including the LDH separator 216 was constructed, such that an epoxy resin-based adhesive was applied along the outer periphery of the LDH separator, and the LDH separator was bonded to a jig made of an ABS resin having an opening at the center. At this time, the bonded area between the jig and the LDH separator was sufficiently sealed with the adhesive to ensure a liquid-tightness. The LDH separator structure was then disposed in the container 212 to isolate a first section 215a including the zinc electrode 214a from a second section 215b including the copper electrode 214b, inhibiting liquid communication other than the area of the LDH separator 216. In this configuration, three outer edges of the LDH separator structure (or three outer edges of the jig made of ABS resin) were bonded to the inner wall of the container 212 with an epoxy resin adhesive to ensure a liquid-tightness. In other words, the bonded area between the separator structure including the LDH separator 216 and the container 212 was sealed to inhibit liquid communication. 5.4 mol/L aqueous KOH solution as an aqueous alkaline solution 218 was poured into the first section 215a and the second section 215b along with ZnO powders equivalent to saturated solubility. The zinc electrode 214a and the copper electrode 214b were connected to a negative terminal and a positive terminal of the constant-current power supply, respectively, and a voltmeter was also connected in parallel with the constant-current power supply. The liquid level of the aqueous alkaline solution 218 was determined below the height of the LDH separator structure (including the jig) such that the entire area of the LDH separator 216 in both the first section 215a and the second section 215b was immersed in the aqueous alkaline solution 218. In the measurement device 210 having such a configuration, a constant current of 20 mA/cm$^2$ was continuously applied between the zinc electrode 214a and the copper electrode 214b for up to 200 hours. During the application of the constant current, the voltage between the zinc electrode 214a and the copper electrode 214b was monitored with a voltmeter to check for short circuiting caused by zinc dendrites (a sharp voltage drop) between the zinc electrode 214a and the copper electrode 214b. No short circuiting for over 100 hours was determined as "(short circuiting) not found", and short circuiting within less than 100 hours was determined as "(short circuiting) found".

Evaluation 5: Helium Permeability

Figure 6A:
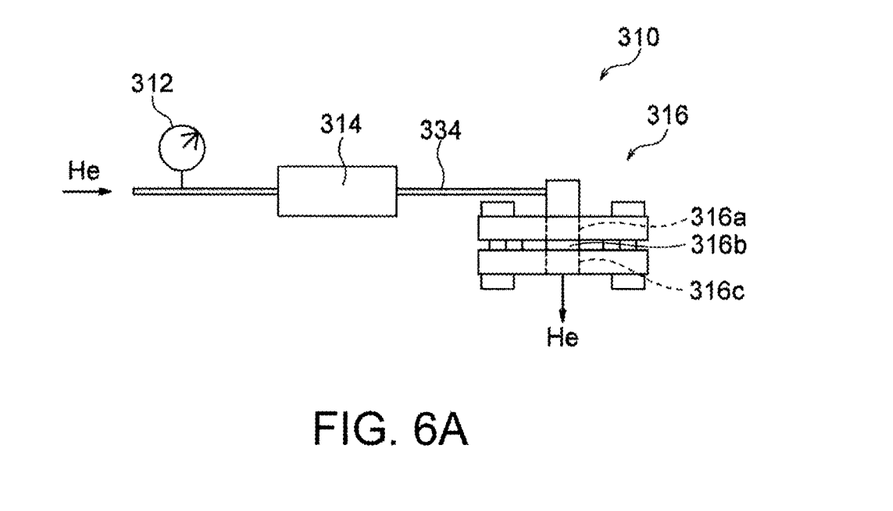
FIG. 6A is a conceptual view illustrating an example system for measuring helium permeability used in Examples 1 to 4.
Figure 6B:
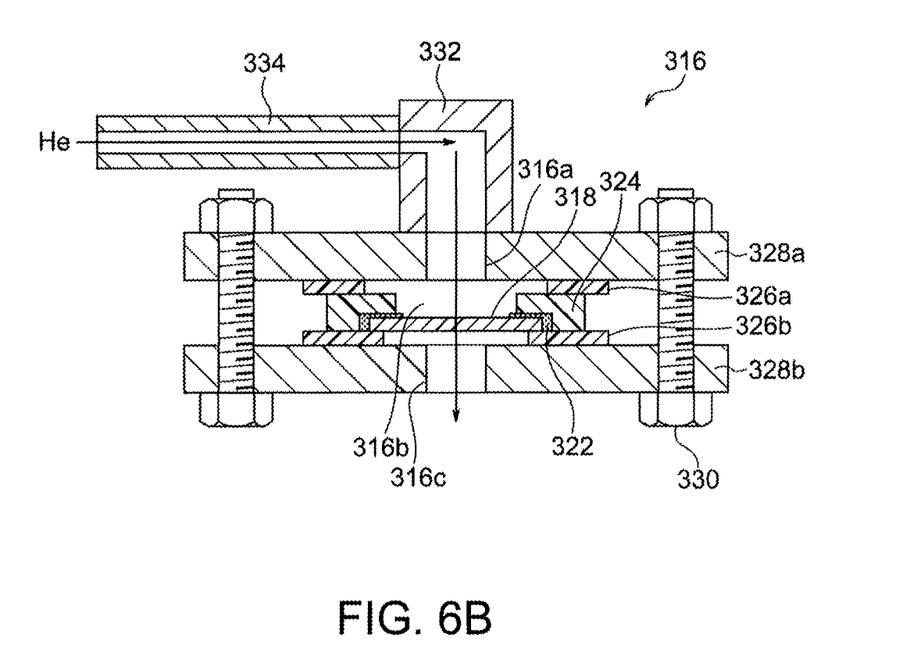
FIG. 6B is a schematic cross-sectional view of a sample holder and its peripheral configuration used in the measurement system shown in FIG. 6A.

A helium permeation test was conducted to evaluate the density of the LDH separator from the viewpoint of helium permeability. The helium permeability measurement system 310 shown in FIGS. 3A and 3B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of the LDH separator 318 held by the sample holder 316.

The sample holder 316 had a structure including a gas supply port 316a, a sealed space 316b and a gas discharge port 316c and was assembled as follows: An adhesive 322 was applied along the outer periphery of the LDH separator 318 and bonded to a jig 324 (made of an ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the LDH separator 318, the jig 324, the sealing member 326a, and the supporting member 328a. The supporting members 328a and 328b were tightly fastened to each other with fastening means 330 with screws not to cause the leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334 and the gas was permeated through the LDH separator 318 held in the sample holder 316. A gas supply pressure and a flow rate were then monitored with a pressure gauge 312 and a flow meter 314. After the permeation of helium gas for one to thirty minutes, the helium permeability was calculated. The helium permeability was calculated from the expression of $F/(P \times S)$ where F ($cm^3$/min) was the volume of permeated helium gas per unit time, P (atm) was the differential pressure applied to the LDH separator when helium gas permeated through, and S ($cm^2$) was the area of the membrane through which helium gas permeates. The permeation rate F ($cm^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm.

Example 1

(1) Preparation of Polymeric Porous Substrate

A commercially available polypropylene porous substrate having a porosity of 60%, a mean pore size of 0.05 μm, and a thickness of 20 μm was cut out into a size of 2.0 cm×2.0 cm.

(2) Coating of Alumina/Titania Sol on Polymeric Porous Substrate

An amorphous alumina solution (Al-ML15, manufactured by Taki Chemical Co., Ltd.) and a titanium oxide sol solution (M6, manufactured by Taki Chemical Co., Ltd.) were mixed at Ti/Al molar ratio of 2 to yield a mixed sol. The substrate prepared in Process (1) was immersed in ethanol for one minute and then immediately transferred into the mixed sol before being dried. The mixed sol was applied onto the substrate by dip coating. In dip coating, the substrate was immersed in 100 mL of the mixed sol, pulled up vertically and dried in a dryer at 90° C. for five minutes.

(3) Preparation of Aqueous Raw Material Solution

Nickel nitrate hexahydrate ($Ni(NO_3)_2 \cdot 6H_2O$, manufactured by Kanto Chemical Co., Inc.), and urea (($NH_2)_2CO_3$ manufactured by Sigma-Aldrich Corporation) were provided as raw materials. Nickel nitrate hexahydrate was weighed to be 0.015 mol/L and placed in a beaker. Ion-exchanged water was added into a total volume of 75 mL. After stirring the solution, the urea weighed at a urea/$NO_3^-$ molar ratio of 16 was added, and further stirred to give an aqueous raw material solution.

(4) Formation of Membrane by Hydrothermal Treatment

The aqueous raw material solution and the dip-coated substrate were encapsulated into a Teflon™ autoclave (the internal volume: 100 mL, covered with stainless steel jacket). The substrate was horizontally fixed away from the bottom of the Teflon™ autoclave such that the solution was in contact with the two surfaces of the substrate. A LDH was then formed on the surface and the interior of the substrate by a hydrothermal treatment at a temperature of 120° C. for 24 hours. After a predetermined period, the substrate was removed from the autoclave, washed with ion-exchanged water, and dried at 70° C. for ten hours to form the LDH in the pores of porous substrate and give the LDH separator.

(5) Results of Evaluation

Figure 7A:
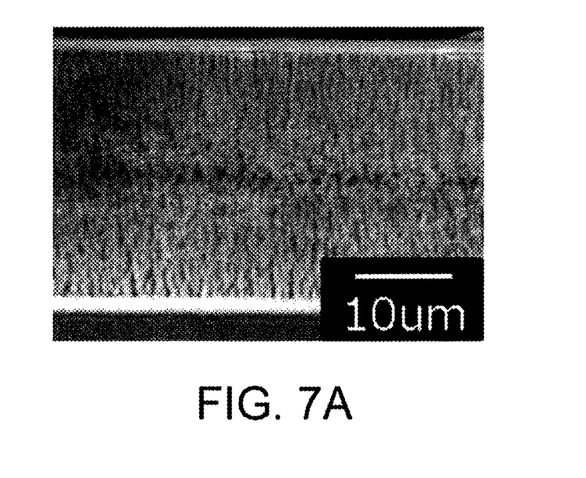
FIG. 7A is a cross-sectional SEM image of the LDH separator produced in Example 1.
Figure 7B:
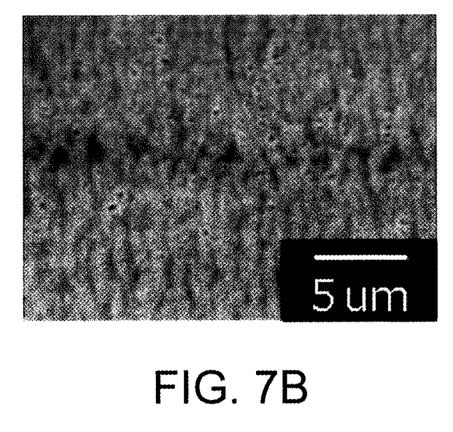
FIG. 7B is a cross-sectional SEM image of the LDH separator produced in Example 1.

The resultant LDH separator was evaluated in accordance with Evaluations 1 to 5. As a result of Evaluation 1, this LDH separator was identified as LDH (hydrotalcite compound). As a result of Evaluation 2, bubbling of helium gas was not observed in this LDH separator. Evaluation 3, as shown in FIGS. 7A and 7B, indicated that this LDH separator had an internal porous layer being free from or deficient in the LDH between a pair of LDH separator bodies. The results of Evaluations 4 and 5 are shown in Table 1.

Example 2

Figure 8:
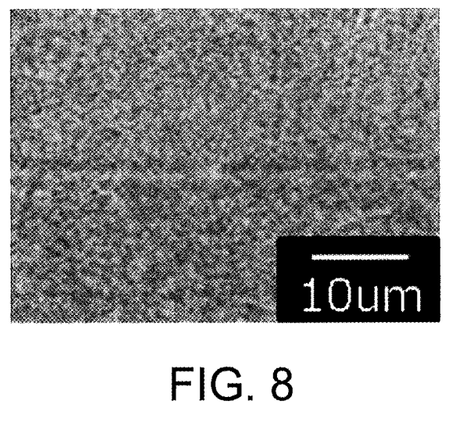
FIG. 8 is a cross-sectional SEM image of the LDH separator produced in Example 2.
Figure 10:
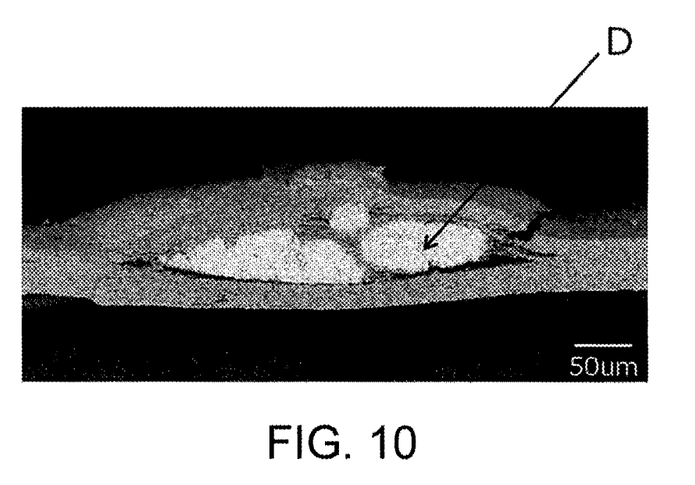
FIG. 10 is a cross-sectional SEM image of the LDH separator produced in Example 2 after the test of short circuiting caused by dendrites. D indicates a dendrite in the image.

A LDH separator layer including no internal porous layer was produced as in Example 1 except that the mixed sol was applied onto the substrate by dip coating without immersion in ethanol in Process (2). Two sheets of the LDH separator layer produced as above were stacked. The stack was disposed between a pair of PET films (Lumirror™ manufactured by Toray Industries, Inc., a thickness of 40 μm), and roll-pressed at a rotation rate of 3 mm/s, at a roller temperature of 100° C., and with a gap between rollers of 150 μm to give a LDH separator including a releasable interfacial layer. The resultant LDH separator was evaluated as in Example 1. As a result of Evaluation 1, this LDH separator was identified as LDH (hydrotalcite compound). As a result of Evaluation 2, bubbling of helium gas was not observed in this LDH separator. Evaluation 3, as shown in FIG. 8, indicated that this LDH separator had a releasable interfacial layer between a pair of LDH separator bodies, thereby the two LDH separator bodies were in releasable contact with each other. The results of Evaluations 4 and 5 are shown in Table 1. FIG. 10 illustrates a cross-sectional SEM image of the LDH separator photographed after the test of short circuiting caused by dendrites in Evaluation 4, where the symbol D indicates a dendrite in the image.

Example 3

Figure 9:
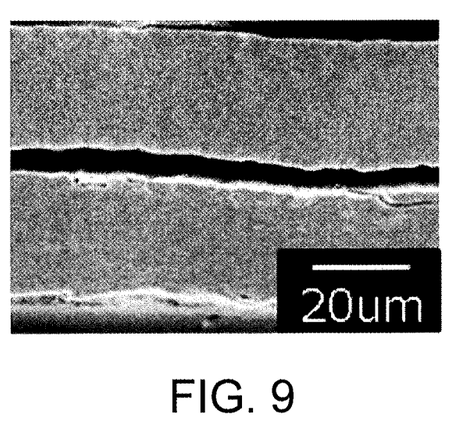
FIG. 9 is a cross-sectional SEM image of the LDH separator produced in Example 3.

A LDH separator layer including no internal porous layer was produced as in Example 1 except that the mixed sol was applied onto the substrate by dip coating without immersion in ethanol in Process (2). Two sheets of the LDH separator layer produced as above were disposed to face each other with a gap of about 5 μm to give a LDH separator including an internal gap layer. The resultant LDH separator was evaluated as in Example 1. As a result of Evaluation 1, this LDH separator was identified as LDH (hydrotalcite compound). As a result of Evaluation 2, bubbling of helium gas was not observed in this LDH separator. Evaluation 3, as shown in FIG. 9, indicates that this LDH separator had an internal gap layer between a pair of LDH separator bodies. The internal gap layer was free from the LDH and the porous substrate between two LDH separator bodies. The results of Evaluations 4 and 5 are shown in Table 1.

Example 4 (Comparative)

A LDH separator layer including no internal porous layer was produced as in Example 1 except that the mixed sol was applied onto the substrate by dip coating without immersion in ethanol in Process (2).

The resultant LDH separator was evaluated as in Example 1. As a result of Evaluation 1, this LDH separator is identified as LDH (hydrotalcite compound). As a result of Evaluation 2, bubbling of helium gas was not observed in this LDH separator. Evaluation 3 indicated that this LDH separator was composed only of a single LDH layer, and no dendrite buffer layer was found. The results of Evaluations 4 and 5 are shown in Table 1.

Example 5

A LDH separator was produced and evaluated as in Example 1 except for the following conditions a) to c).

a) A commercially available polyethylene porous substrate having a porosity of 40%, a mean pore size of 0.05 μm and a thickness of 20 μm was used for the polymeric porous substrate in Process (1).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added to a total volume of 75 mL. After stirring the resultant solution, urea weighed at a urea/$NO_3^-$ molar ratio of 8 was added, and further stirred to give an aqueous raw material solution.

c) The hydrothermal temperature in Process (4) was 90° C.

As a result of Evaluation 1, this LDH separator was identified as LDH (hydrotalcite compound). As a result of Evaluation 2, bubbling of helium gas was not observed in this LDH separator. Evaluation 3 indicated that this LDH separator had an internal porous layer free from or deficient in the LDH between a pair of LDH separator bodies, similar to Example 1. The results of Evaluations 4 and 5 are shown in Table 1.

Example 6

A LDH separator layer including no internal porous layer was produced as in Example 1 except for the following conditions a) to d).

a) A commercially available polyethylene porous substrate having a porosity of 40%, a mean pore size of 0.05 μm and a thickness of 20 μm was used for the polymeric porous substrate in Process (1).

b) The mixed sol was applied onto the substrate by dip coating without immersion in ethanol in Process (2).

c) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added to a total volume of 75 mL. After stirring the resultant solution, urea weighed at a urea/$NO_3^-$ molar ratio of 8 was added and further stirred to give an aqueous raw material solution.

d) The hydrothermal temperature in Process (4) was 90° C.

Two sheets of the LDH separator layer produced as above was stacked. The stack was disposed between a pair of PET films (Lumirror™ manufactured by Toray Industries, Inc., a thickness of 40 μm), and roll-pressed at a rotation rate of 3 mm/s, at a roller temperature of 100° C., and with a gap between rollers of 150 μm to give a LDH separator including a releasable interfacial layer. The resultant LDH separator was evaluated as in Example 1. As a result of Evaluation 1, this LDH separator was identified as LDH (hydrotalcite compound). As a result of Evaluation 2, bubbling of helium gas was not observed in this LDH separator. Evaluation 3 indicated this LDH separator had the releasable interfacial layer between a pair of LDH separator bodies, thereby, two LDH separator bodies were in releasable contact with each other, similar to Example 2. The results of Evaluations 4 and 5 are shown in Table 1.

Example 7

A LDH separator layer including no internal porous layer was produced as in Example 1 except for the following conditions a) to d).

a) A commercially available polyethylene porous substrate having a porosity of 40%, a mean pore size of 0.05 μm and a thickness of 20 μm was used for the polymeric porous substrate in Process (1).

b) The mixed sol was applied onto the substrate by dip coating without the immersion in ethanol in Process (2).

c) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added to a total volume of 75 mL. After stirring the resultant solution, urea weighed at a urea/$NO_3^-$ molar ratio of 8 was added and further stirred to give an aqueous raw material solution.

d) The hydrothermal temperature in Process (4) was 90° C.

Two sheets of the LDH separator layer produced as above were disposed to face each other with a gap of about 5 μm to give a LDH separator including an internal gap layer as a whole. The resultant LDH separator was evaluated as in Example 1. As a result of Evaluation 1, this LDH separator was identified as LDH (hydrotalcite compound). As a result of Evaluation 2, bubbling of helium gas was not observed in this LDH separator. Evaluation 3 indicated that this LDH separator had, between a pair of LDH separator bodies, an internal gap layer free from the LDH and the porous substrate, similarly to Example 3. The results of Evaluations 4 and 5 are shown in Table 1.

Example 8 (Comparative)

A LDH separator layer including no internal porous layer was produced as in Example 1 except for the following conditions a) to c).

a) A commercially available polyethylene porous substrate having a porosity of 40%, a mean pore size of 0.05 μm and a thickness of 20 μm was used for the polymeric porous substrate in Process (1).

b) The mixed sol was applied onto the substrate by dip coating without immersion in ethanol in Process (2).

c) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added to a total volume of 75 mL. After stirring the resultant solution, urea weighed at a urea/$NO_3^-$ molar ratio of 8 was added and further stirred to give an aqueous raw material solution.

d) The hydrothermal temperature in Process (4) was 90° C.

As a result of Evaluation 1, this LDH separator was identified as LDH (hydrotalcite compound). As a result of Evaluation 2, bubbling of helium gas was not observed in this LDH separator. Evaluation 3 indicated that this LDH separator was composed only of a single LDH layer and no dendrite buffer layer was found. The results of Evaluations 4 and 5 are shown in Table 1.

TABLE 1

| | Types of | | Evaluations | |
| --- | --- | --- | --- | --- |
| | Dendrite buffer layer | dendrite buffer layer | Helium permeability (cm/atm · min) | Short circuit cause by dendrites |
| Example 1 | With | Internal porous layer | 0.1 | Not found |
| Example 2 | With | Releasable interfacial layer | 0 | Not found |
| Example 3 | With | Internal space layer | 0 | Not found |
| Example 4 (comparative) | Without | — | 0.1 | Found |
| Example 5 | With | Internal porous layer | 0 | Not found |
| Example 6 | With | Releasable interfacial layer | 0 | Not found |
| Example 7 | With | Internal space layer | 0 | Not found |
| Example 8 (comparative) | Without | — | 0.1 | Found |

What is claimed is:

1. A layered double hydroxide separator for secondary zinc batteries, comprising a porous substrate made of a polymer material; and a layered double hydroxide plugging pores in the porous substrate, wherein the layered double hydroxide separator has in its inside a dendrite buffer layer, wherein the dendrite buffer layer is at least one selected from the group consisting of:

(i) a pore-rich internal porous layer in the porous substrate, the pore-rich internal porous layer being free from the layered double hydroxide or deficient in the layered double hydroxide;

(ii) a releasable interfacial layer, which is provided by two adjacent layers constituting part of the layered double hydroxide separator being in releasable contact with each other; and (iii) an internal gap layer being free from the layered double hydroxide and the porous substrate, which is provided by two adjacent layers constituting part of the layered double hydroxide separator being formed apart from each other; and the pore-rich internal porous layer free from or deficient in the layered double hydroxide is interposed between and contacting with a pair of layered double hydroxide separator bodies made of the porous substrate having the layered double hydroxide plugging the pores thereof.

2. The layered double hydroxide separator according to claim 1, wherein the layered double hydroxide is incorporated over the entire thickness of the porous substrate other than the dendrite buffer layer.

3. The layered double hydroxide separator according to claim 1, wherein the dendrite buffer layer is (i) a pore-rich internal porous layer in the porous substrate, the internal porous layer being free from the layered double hydroxide or deficient in the layered double hydroxide.

4. The layered double hydroxide separator according to claim 1, wherein the dendrite buffer layer is (ii) a releasable interfacial layer, which is provided by two adjacent layers constituting part of the layered double hydroxide separator being in releasable contact with each other.

5. The layered double hydroxide separator according to claim 1, wherein the dendrite buffer layer is (iii) an internal gap layer being free from the layered double hydroxide and the porous substrate, which is provided by two adjacent layers constituting part of the layered double hydroxide separator being formed apart from each other.

6. The layered double hydroxide separator according to claim 1, wherein the layered double hydroxide separator has a helium permeability per unit area of 3.0 cm/atm·min or less.

7. The layered double hydroxide separator according to claim 1, wherein the polymer material is selected from the group consisting of polystyrene, poly(ether sulfone), polypropylene, epoxy resin, poly(phenylene sulfide), fluorocarbon resin, cellulose, nylon and polyethylene.

8. The layered double hydroxide separator according to claim 1, consisting of the porous substrate and the layered double hydroxide.

9. A secondary zinc battery comprising the layered double hydroxide separator according to claim 1.

10. The layered double hydroxide separator according to claim 1, wherein the pore-rich internal porous layer is free from the layered double hydroxide.

11. The layered double hydroxide separator according to claim 1, where the pore-rich internal porous layer is deficient in the layered double hydroxide.

* * * * *